United States Patent [19]

Julian et al.

[11] 4,049,335

[45] Sept. 20, 1977

[54] SEALED BATTERY THREADED STUD TERMINATION

[76] Inventors: Victor J. Julian, 2400 Bellvue, Westchester, Ill. 60153; Kenneth A. Julian, 769 Oakwood Drive, Westmont, Ill. 60559

[21] Appl. No.: 727,405

[22] Filed: Jan. 10, 1977

[51] Int. Cl.² .......................................... H01R 11/26
[52] U.S. Cl. .................................. 339/224; 339/232; 339/276 T
[58] Field of Search .......................... 339/224–240, 339/276 T

[56] References Cited

U.S. PATENT DOCUMENTS

| | | | |
|---|---|---|---|
| 1,175,651 | 3/1916 | Marko | 339/224 X |
| 1,789,951 | 1/1931 | Terrell et al. | 339/276 T X |
| 3,928,079 | 12/1975 | Jennings et al. | 339/224 X |

*Primary Examiner*—Roy Lake
*Assistant Examiner*—E. F. Desmond
*Attorney, Agent, or Firm*—Edmond T. Patnaude

[57] ABSTRACT

Low resistance in-line and end battery cable terminations incorporate a plastic cover which is molded over an apertured lug which fits over the battery stud and which includes a captured nut for attachment to the stud.

10 Claims, 7 Drawing Figures

U.S. Patent    Sept. 20, 1977    4,049,335
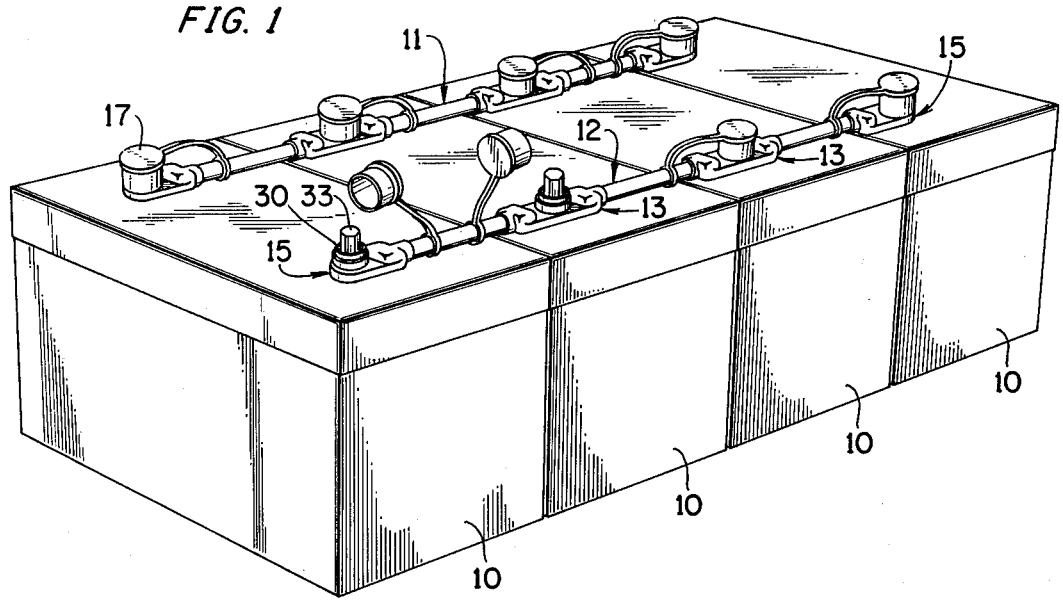
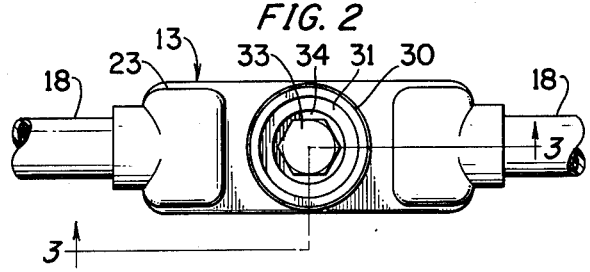
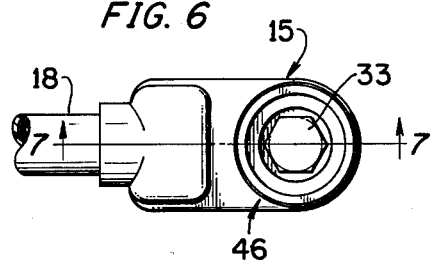
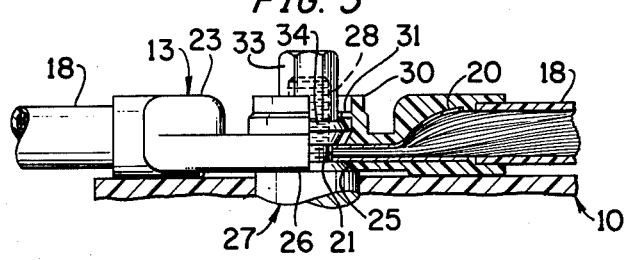
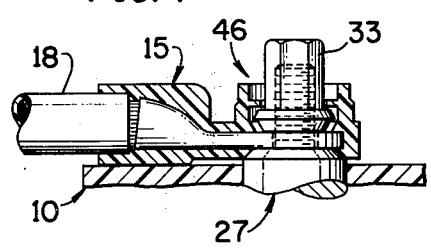
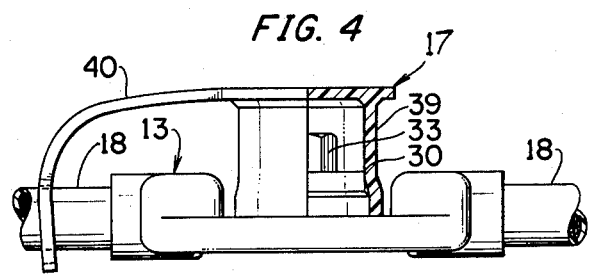
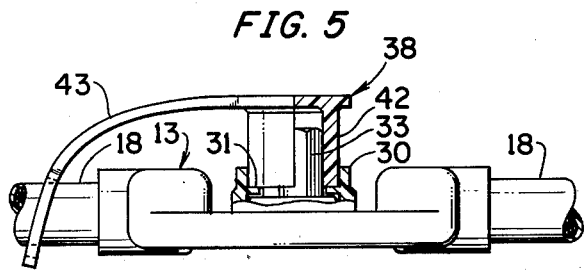

SEALED BATTERY THREADED STUD TERMINATION

The present invention relates in general to cable terminations for connection to the terminals of batteries, and it relates in particular to a new and improved insulated connector construction which is adapted to be used in both in line and end terminations.

BACKGROUND OF THE INVENTION

Wet cell storage batteries such, for example, as those used in automotive vehicles, commonly employ upstanding threaded studs as the terminal members. The connectors which are provided on the ends of battery cables for connection to the terminal members are known in the art as terminations and have in the past generally been in the form of apertured lugs crimped to the ends of the battery cables. When two or more batteries were to be connected together, either in parallel or in series, the lugs from two or more such cables were placed one over the other on the battery studs and held in place by a nut threaded onto the stud. In many cases this type of connection has resulted in increased resistance between the battery terminal and the load to which the battery is connected. Moreover, corrosion of the stud and termination has been a problem.

SUMMARY OF THE INVENTION

Briefly, there is provided in accordance with one aspect of the present invention a battery cable termination and method of making the same which incorporates a plastic cover molded onto the cable over a flat apertured connector member which fits onto the battery stud. A nut is rotatably held by the cover and is used to tighten the connector member against the base of the battery stud. In order to interconnect two or more batteries either in series or in parallel, one or more terminations are provided intermediate the ends of the cable for providing low resistance connections to the studs of the batteries.

In accordance with another aspect of the invention the termination is manufactured by stripping the insulation from a portion of the cable, then placing a copper tube over the stripped portion, then flattening the center portion of the tube and the strands of cable enclosed in the tube, punching a stud receiving hole through the flattened tube and cable, and then molding a plastic insulating cover around the tube.

GENERAL DESCRIPTION OF THE DRAWING

Further objects and advantages and a better understanding of the present invention can be had by reference to the following detailed description wherein:

FIG. 1 is a perspective view of a plurality of wet cell storage batteries connected together in parallel by means of cables and cable terminations embodying the present invention;

FIG. 2 is a top view of the intermediate battery cable terminations shown in FIG. 1;

FIG. 3 is an elevational view, partly in section, of the termination shown in FIG. 2 connected to a terminal stud of a battery;

FIG. 4 is a partially sectioned view of a termination and sealing cap embodying the present invention;

FIG. 5 is a partially sectioned view of a termination and a different sealing cap embodying the present invention;

FIG. 6 is a plan view of an end termination embodying the present invention; and FIG. 7 is a partially sectioned elevational view of the termination of FIG. 6.

DETAILED DESCRIPTION OF THE INVENTION

Referring particularly to FIG. 1, a plurality of storage batteries 10 are connected in parallel by a pair of stranded cables 11 and 12 connected to the battery terminals by novel cable terminations embodying the present invention. The cables 11 and 12 may be identical but it will be understood that the present invention is not limited to any particular cable configuration. For example, the present invention may be used for connecting a plurality of batteries together in series as is commonly done in industrial types of equipment.

In accordance with one feature of the present invention the cables 11 and 12 each comprise a single length of stranded cable extending from one end of the cable to the other. Where intermediate portions of the cable are to be connected to battery terminal studs, one or more intermediate terminations 13 are provided in the cable. Two end terminations 15 are provided at the ends of the cables 11 and 12. As this description of the invention proceeds it will be appreciated that the intermediate and end battery terminations of the present invention have many features in common and may be manufactured in accordance with the same basic method. As shown in FIG. 1, removable sealing and insulating caps 17 are provided for each of the terminations, and these caps function to seal the terminations and the battery terminal studs from the elements and, more importantly, from the corrosive fumes emanating from the batteries along the sides of the studs.

Reference is now made to FIGS. 2 and 3 for a better understanding of the construction of the intermediate termination 13 and its method of manufacture. In order to form an intermediate termination in a length of insulated stranded cable 18, the insulation is removed or stripped from an intermediate section of the cable and a short length of copper tubing 20 is placed over the stripped portion of the stranded cable as illustrated in FIG. 3. Preferably the tubing 20 is slightly longer than the stripped portion of the cable so as to overlie the adjacent ends of the cable insulation. The thus assembled tubing and cable are placed in a press which flattens out the intermediate portion of the copper tubing and the portion of the cable which is disposed thereon. Also the ends of the tube are slightly crimped into the cable. A hole 21 is then punched through the flattened central section of both the tube 20 and the enclosed cable strands. The punched area is then coated with hot solder to form a low resistance, fixed connection between the copper tube 20 and the conductive strands in the cable. Thereafter, the assembly is placed in an injection mold and a covering or enclosure 23 of polyvinylchloride or other suitable plastic or rubber is molded directly over the tube 20. As shown in FIG. 3, a portion of the cover 23 overlies the ends of the insulating layer on the cable thereby to form a unitary bond and seal therewith. During the injection molding process the polyvinylchloride or other plastic is sufficiently hot as to melt the adjacent portions of the cable insulation so that when the heated parts cool and solidify, an integral joint and weather proof seal is provided between the two ends of the cover 23 and the insulating layer on the cable 18.

The mold in which the covering 23 is formed provides a circular hole 25 at the bottom which is substantially complimentary to the upper portion of the base or pedestal 26 of the battery stud 27. The battery stud 27 extends through the upper wall of the casing of the battery 10 and is connected internally of the battery to the electrodes thereof. In addition to the base, the terminal 27 includes an upstanding threaded stud 28 for use in making external electric connections to the battery.

The diameter of the punched hole 21 is slightly larger than the external diameter of the stud 28 so that the termination freely fits onto the stud with an annular surface of the lower wall of the flattened copper tube 20 lying directly on the upper shoulder of the battery terminal pedestal 26. Moreover, an annular seal is provided between the covering 23 and the abutting annular shoulder on the pedestal 26. In this manner corrosive fumes which emanate from the battery between the casing and the terminal 27 cannot reach the area where the electric connection is made between the cable and the terminal stud.

The plastic covering 23 includes an integral, upstanding tubular portion 30 having an internal annular bead 31 intermediate the top and bottom thereof. A nut 33 which is adapted to be threaded onto the battery stud 28 has a flange or shoulder 34 near the bottom which is larger in diameter than the internal diameter of the bead 31 and lies below the bead 31 so that the nut 33 is freely rotatable within the termination but held thereto by the bead 31.

In use, the termination 13 is placed over a battery stud 28 so that the opening 25 is aligned with the pedestal portion 26 of the battery terminal. The nut 33 is then tightened onto the stud 28 thereby to compress the flattened intermediate portion of the tube 20 between the bottom surface of the nut 33 and the upper surface of the pedestal 26 on the terminal 27. A good mechanical and electrical connection is thus made with the cable extending from both ends of the termination. Moreover, the portion of the covering 23 defining the hole 25 is pressed tightly against the base 26 to provide a moisture seal between the terminal and the termination. Thereafter, a sealing cap member 17 as shown in FIG. 4, or a sealing cap member 38 as shown in FIG. 5, is snap fitted to the tubular portion 30 over the nut 33 to seal the interior of the termination from the ambient. The cap 17 may be formed of a somewhat resilient plastic insulating material and has a depending tubular skirt portion 39 which is pressed over the outer side of the tubular portion 30. Preferably, a flexible integral piece 40 connects the cap 17 to the cable so as to prevent inadvertent removal and the loss thereof.

In the embodiment illustrated in FIG. 5 the cap 38 has a depending tubular skirt portion 42 which sealably extends into the tubular portion 30 to seal the interior of the termination from the ambient. It also is preferably held captive to the cable by a flexible connection 43 which may be integral with the cap.

Referring to FIGS. 6 and 7, an end termination 15 is shown in detail. It is of the same basic construction as the intermediate termination 13 except that the cable 18 extends from only one end thereof. In forming the end termination 15 the end of the stranded cable 18 is stripped of its insulating covering and a copper tube substantially equal in length to the stripped portion of the cable is placed thereon. The distal end of the copper tubing and the enclosed strands of the cable are then flattened out and the hole for receiving the stud is punched therein. The entire copper tubing and exposed portions of the cable, both at the sides of the hole and at the end of the tube, are then bathed in solder. The plastic covering is then molded in place thereover to provide a seal therefor.

There is thus provided in accordance with the present invention a new and improved battery cable termination which provides an enclosed, sealed connection between the cable and a battery stud. The enclosure protects the electric connection from the atmosphere and prevents inadvertent contact with the battery terminals by service personnel. Moreover in accordance with the invention a single stranded cable extends continuously between all of the terminal studs which are to be connected together thereby eliminating the multiple ohmic connections which were heretofore provided between interconnected batteries when separate lengths of cable were used to connect the terminals of a plurality of batteries. Should a poor ohmic connection be made to any one battery terminal, that one poor connection affects only the particular battery at which it is located and not all of the others to which it is connected.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A termination for connecting an electric cable to a shouldered terminal stud of a battery, comprising
    a tubular conductive member surrounding a portion of said cable,
    said tubular member having top and bottom flat surfaces,
    said surfaces and said cable being provided with aligned holes therethrough for receiving said stud,
    a plastic cover molded directly over said tubular member and having top and bottom openings aligned with said holes,
    said bottom opening being sufficiently large to receive at least the upper portion of the shoulder on said stud, and
    fastening means disposed in said top opening for engaging said stud and holding said bottom flat surface tightly against said shoulder.

2. A termination according to claim 1 wherein said fastening means is a nut threaded onto said stud.

3. A termination according to claim 2 wherein said nut is rotatably carried by said cover.

4. A termination according to claim 1 wherein said cover comprises
    an upstanding tubular portion surrounding said fastening means, and
    a cap sealably secured to said tubular portion over said fastening means.

5. A termination according to claim 4 wherein said cover is a resilient material, and
    the portion of said cover surrounding said bottom opening sealably engages said stud.

6. A battery cable comprising a plurality of battery terminations according to claim 1.

7. A battery cable according to claim 6 wherein at least one of said terminations is intermediate the ends of said cable, and said cable is continuous from one end to the other.

8. A battery cable according to claim 1 wherein said cable is stranded and has an insulating layer thereon, said layer being removed from the portion of said cable extending through said tubular member and said cover being bonded to the portion of said layer adjacent thereto.

9. A method of making a battery termination on a cable, comprising inserting a bare portion of said cable into a conductive tube, flattening a portion of said tube and said cable, forming a hole through the flattened portion of said tube and said cable, and molding over said tube a plastic cover having openings therein in alignment with said hole.

10. A method according to claim 9 wherein said cable has an insulating layer adjacent said bare portion and wherein said cover is molded directly around a portion of said layer to bond said cover to said layer.

* * * * *

REEXAMINATION CERTIFICATE (219th)

United States Patent [19]

Julian et al.

[11] B1 4,049,335

[45] Certificate Issued Jul. 17, 1984

[54] SEALED BATTERY THREADED STUD TERMINATION

[76] Inventors: Victor J. Julian, 2400 Bellvue, Westchester, Ill. 60153; Kenneth A. Julian, 769 Oakwood Dr., Westmont, Ill. 60559

Reexamination Request:
No. 90/000,111, Nov. 13, 1981

Reexamination Certificate for:
Patent No.: 4,049,335
Issued: Sep. 20, 1977
Appl. No.: 727,405
Filed: Jan. 10, 1977

[51] Int. Cl.$^3$ .............................................. H01R 11/26
[52] U.S. Cl. .................................... 339/224; 339/232; 339/276 T
[58] Field of Search ............... 339/28, 29 B, 224–240, 339/95 B, 265 B, 276 T, 296 A, 116 R, 116 C

[56] References Cited

U.S. PATENT DOCUMENTS

| | | | |
|---|---|---|---|
| 1,650,295 | 11/1927 | Patten . | |
| 1,789,951 | 1/1931 | Terrell et al. | 339/276 T X |
| 2,251,176 | 7/1941 | Temple | 153/2 |
| 2,789,274 | 4/1957 | Zam | 339/116 C |
| 3,389,368 | 6/1968 | Schaefer | 339/116 R |
| 3,816,641 | 6/1974 | Iversen | 339/218 R |
| 3,928,079 | 12/1975 | Jennings et al. | 339/116 R |
| 4,043,630 | 8/1977 | Suverison et al. | 339/218 M |

OTHER PUBLICATIONS

"In-line Press Lug", Julian Electric Inc. Dwg. No. 39HA0900, 7/24/75.

*Primary Examiner*—E. F. Desmond

[57] ABSTRACT

Low resistance in-line and end battery cable terminations incorporate a plastic cover which is molded over an apertured lug which fits over the battery stud and which includes a captured nut for attachment to the stud.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *